Patented Feb. 22, 1944

2,342,478

UNITED STATES PATENT OFFICE 2,342,478

CELLULOSIC PLASTIC

George F. Metz, Yonkers, N. Y.

No Drawing. Application July 7, 1938,
Serial No. 217,919

3 Claims. (Cl. 106—171)

The present invention relates to cellulose acetate plastics, and particularly to compositions of this kind, and especially molding powders, which are to be employed in an extrusion machine for the manufacture, for example, of die-cast articles.

Cellulose plastics are known which contain camphor as a plasticizer and also triphenyl phosphate as a fire-proofing agent in addition to various solvents. These known compositions have been found in practice to exhibit certain disadvantages, especially when employed in a heated extrusion machine; among which may be mentioned a tendency to stick to the extrusion cylinder with resulting carbonization at the walls of the cylinder; while the compositions are generally deficient in lustre, smoothness of surface and hardness, and the finished articles have shown a tendency to warp.

The present invention has for its general object the production of a cellulose acetate composition which is characterized by easy and uniform flow through the extrusion machine with practically no tendency to accumulate at or stick to the heated cylinder walls of an extrusion machine.

It is a further object of the invention to provide a cellulose acetate composition which is characterized by a low shrinkage coefficient in the finished article, whereby warping and other distortion are practically eliminated.

It is a still further object of the invention to provide a cellulose acetate composition which is capable of yielding injection-molded articles characterized by unusual uniformity and homogeneity of structure and by an unusually high luster and gloss.

It is also an object of the invention to compound a cellulose acetate plastic with solvents of such character that substantially complete elimination of the solvent is insured, thereby reducing the possibility of subsequent warping and other distortion.

The invention thus contemplates the production of a plastic composition, particularly in the form of a molding powder, which is especially suited for injection molding, as it flows smoothly through the extrusion cylinder and also through the extrusion nozzle without sticking to the heated walls thereof, and yields articles having a smooth and lustrous surface, thereby avoiding in large measure, if not entirely, the necessity of buffing, the articles being unusually dense and tough, and substantially free from shrinking and warping; the composition being capable of yielding articles which are more flexible or more rigid, as may be required, depending upon the character of certain additions which will be described in detail hereinbelow.

According to my invention, there is added to a mixture of cellulose acetate, any suitable fire-proofing agent (which may, however, be omitted, if desired) and a plasticizer, such as camphor or any equivalent thereof, one or more substances which singly and in combination impart one or more of the desirable qualities above referred to. Thus, I have found that about 1 to 4% (based on the weight of the cellulose derivative) of an aryl ketone, for example diphenyl ketone or benzophenone, imparts a lustrous, crystal-like appearance and a smooth surface to the product and makes it take an unsually high polish very easily, at the same time improving the machining qualities of the product and permitting punching and similar operations to be done without danger of chipping and cracking. A further desirable addition to the plastic is spermaceti or a triglyceride, such as stearin or coconut, castor or cottonseed oils, i. e., non-drying oils, and also stearic acid, oleic acid, japan wax, Chinese waxes, beeswax, paraffin, etc., the amounts varying from about 1 to about 5% by weight of the cellulose derivative. These fatty or waxy substances impart smooth-flowing qualities to the material, the substances named mixing uniformly with the cellulose plastic and causing the composition to flow smoothly through the extrusion cylinder and nozzle and without sticking to the walls thereof. By the use of these fatty or waxy additions, charring of the material is prevented and discoloration of the product thereby avoided.

My improved composition preferably contains also about 2 to 10% of a trialkyl carbinol, such as trimethyl carbinol, such compound reducing or practically eliminating shrinkage in the final product.

Compositions prepared in accordance with my invention have higher softening points, there being a narrower range between the softening point and the extrusion fluidity than is the case with prior compositions known to me. In fact, my improved composition will flow at lower temperatures than known compositions, and in spite of the presence of plasticizers, the new product will be found to be harder and tougher than known cellulose acetate plastics. Thus, compositions prepared by me in accordance with the invention and as described hereinbelow have a range between the softening point and the extrusion fluidity of 248° to 320° F., whereas the range in known compositions is about 175° to 375° F.

An improved aspect of my invention resides in the presence in the plastic mass of higher boiling solvents in combination with lower boiling solvents, the latter having the function of aiding the expulsion of the higher boiling solvents when the mass is worked up on the rolls. In this way I assure substantially complete elimination of volatile material, whereby, particularly with the aid of the trialkyl carbinol, shrinkage and warping of the finished shaped article is reduced or completely eliminated.

Several examples of my improved composition are given in detail below, but it will be understood that they are given merely by way of illustrations and that the invention is not limited thereto.

Example 1

| | Parts by weight |
|---|---|
| Cellulose acetate | 100 |
| Triphenyl phosphate | 12 |
| Trimethyl carbinol | 4 |
| Camphor | 4 |
| Diphenyl ketone | 2 |
| Spermaceti | 1 |
| Amylic alcohol | 40 |
| Ethyl acetate | 8½ |
| Acetone | 7½ |

The above materials are mixed together at room temperature or at temperatures up to about 104° F. for about 30 minutes in a mixer and then fed in the form of flakes (the solvent material is insufficient to make the mass liquid) onto heated rolls, the final temperature being about 270° to about 320° F. After passing through the rolls a few times, the plastic mass sticks thereto and becomes thoroughly kneaded and mixed. The working up on the heated rolls at the temperatures mentioned, is continued until the volatile material is substantially completely eliminated. About 20-30 minutes will ordinarily be sufficient. The expulsion of the last portion of the amyl alcohol and other higher boiling materials is facilitated by the lower boiling ethyl acetate and acetone. The product so obtained does not require drying in an oven as has been customary heretofore; after breaking up into pieces and grinding it can be stored for long periods of time or aged at 110-130° F. without any appreciable loss of weight and without warping.

The resulting composition is excellently suited for injection molding. The stock is fed in the usual manner into an extrusion press which is heated to about 250° to 320° F. in any suitable way. The material flows easily and smoothly and does not adhere to the walls of the extrusion cylinder. The molded articles, after an aging period of several hours to several days, show no appreciable tendency to shrink or warp, and are dense, hard and characterized particularly by a smooth and highly lustrous, crystal-like surface. The above composition yields a thermo-plastic mass which is extremely rigid at room temperatures and is, therefore, well suited for the manufacture of such articles as combs and the like.

Example 2

| | Parts |
|---|---|
| Cellulose acetate | 100 |
| Trimethyl carbinol | 2 |
| Triphenyl phosphate | 16 |
| Diphenyl ketone | 1 |
| Camphor | 4½ |
| Coconut oil or cottonseed oil | ½ |
| Amylic alcohol or crude fusel, grain or potato alcohol | 50 |
| Ethyl acetate | 10 |
| Acetone | 5 |

This composition is worked up in known manner, as described in Example 1 and yields a product which is more flexible than that obtained with the composition set forth in Example 1, and is suitable for the manufacture of catalogue binders and other articles requiring a high degree of flexibility.

Example 3

| | Parts |
|---|---|
| Cellulose acetate | 100 |
| Triphenyl phosphate | 6 |
| Camphor | 5 |
| Trimethyl carbinol | 8 |
| Diphenyl ketone | 1 |
| Spermaceti | 1 |
| Diethyl phthalate | 15 |
| Dimethyl phthalate | 20 |

Any suitable amount of volatile solvent can be added to this mixture to obtain the desired consistency. The phthalic acid esters may be omitted but it is desirable to employ at least one of them. The mixture, after working up on the rolls or otherwise, yields a homogeneous thermoplastic mass which flows smoothly through an extrusion press. The molded articles obtained therewith have a smooth lustrous surface, and after a short period of aging will not warp or shrink.

While considerable variations from the proportion above specified may be resorted to while yet securing the advantages of my invention, I prefer to employ the following ranges of proportions of the several materials:

| | | |
|---|---|---|
| Cellulose acetate (or other aliphatic acid ester) parts by weight | 100 | |
| Camphor (or other plasticizer) parts | 3 to | 8 |
| Diphenyl ketone do | 1 to | 4 |
| Spermaceti (or coconut or cottonseed oil or equivalent) parts | ½ to | 5 |
| Triphenyl phosphate or other compatible fire-proofing agent parts | 12 to | 20 |
| Trialkyl carbinol do | 2 to | 10 |

The camphor can be replaced in whole or in part by the known equivalents thereof, including borneol and various acyl, such as acetyl, derivatives of primary and secondary aromatic amines, aromatic sulfo compounds, aromatic nitro compounds, phenol derivatives, etc.

While the use of trimethyl carbinol is preferred, it may be replaced in whole or in part by other tertiary alcohols, such as tributyl carbinol and the higher tertiary aliphatic carbinols, or by alkyl-aryl carbinols or mixed alkyl carbinols, like methyl diethyl carbinol, but the use of the carbinols of lower carbon content has in general been found by me to give best results.

As equivalents of diphenyl ketone, I have found both the diaryl and the alkyl-aryl ketones, like acetophenone, to be quite satisfactory and to be capable of use in place of at least part, and in certain instances of all, of the diphenyl ketone. Thus, dicresyl ketone and the higher homologues and the substitution products of these ketones containing groups which are not undesirably reactive toward the other compounds of the mixture can be employed, but best results are in most cases obtained with diphenyl ketone.

The products above described may be colored if desired by incorporating therein suitable dyes or pigments.

I claim:

1. A molding composition comprising a uniform mixture of cellulose acetate, camphor, a fire-proofing agent, a trialkyl carbinol, an aryl ketone, a member of the group consisting of fatty triglycerides of high molecular weight, fatty acids, and waxes compatible with the cellulose acetate, and a solvent mixture comprising an aliphatic alcohol and an organic acid esters.

2. A molding powder comprising the ground evaporated mixture of 100 parts of cellulose acetate and approximately three to eight parts of camphor, one to four parts of diphenyl ketone, one-half to five parts of spermaceti, two to ten parts of trimethyl carbinol, twelve to twenty parts of a compatible fire-proofing agent, and a volatile solvent mixture.

3. A plastic composition comprising a uniform mixture of cellulose acetate, camphor, trimethyl carbinol, diphenyl ketone, spermaceti, and a volatile solvent.

GEORGE F. METZ.